Feb. 3, 1970 G. A. BAILEY 3,493,942
MAGNETIC MATRIX MEMORY SYSTEM
Filed March 28, 1967 2 Sheets-Sheet 1
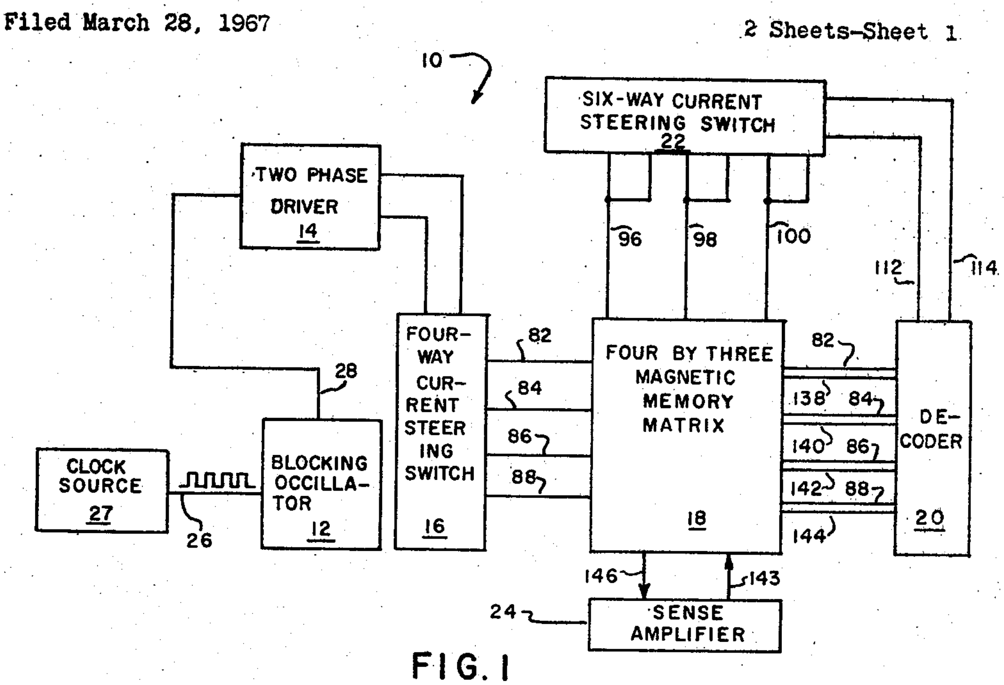
FIG. 1
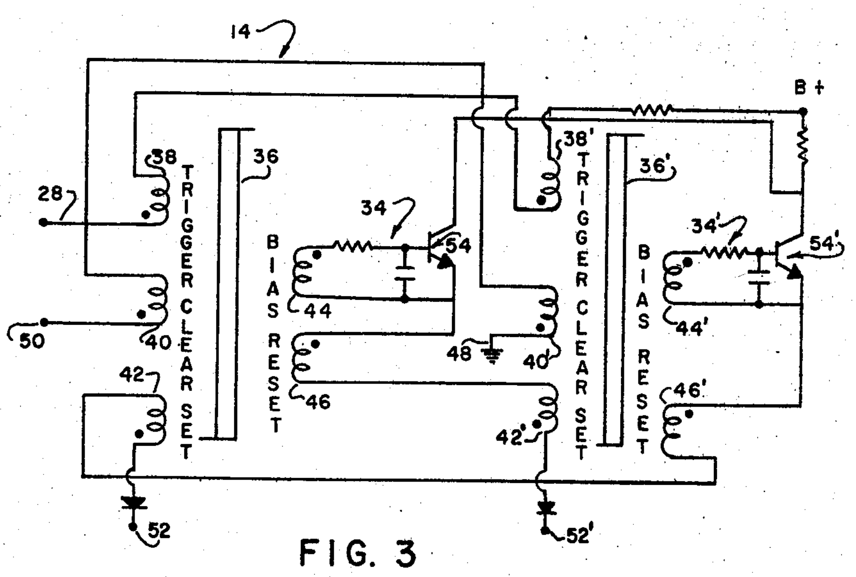
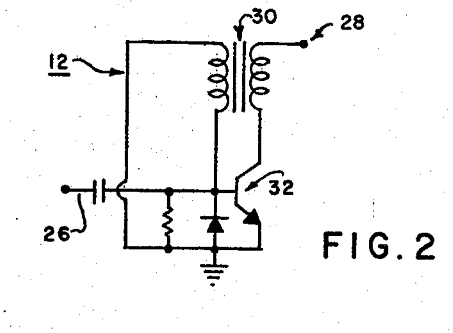
INVENTOR
GEORGE A. BAILEY
BY
ATTORNEY Feb. 3, 1970 G. A. BAILEY 3,493,942

MAGNETIC MATRIX MEMORY SYSTEM

Filed March 28, 1967 2 Sheets-Sheet 2

INVENTOR
GEORGE A. BAILEY

BY [signature]
Arthur S Tischler
ATTORNEY 3,493,942
Patented Feb. 3, 1970

3,493,942
MAGNETIC MATRIX MEMORY SYSTEM

George A. Bailey, Huntsville, Ala., assignor to the United States of America as represented by the Administrator of the National Aeronautics and Space Administration Filed Mar. 28, 1967, Ser. No. 627,257
Int. Cl. G11b 5/62
U.S. Cl. 340—174 8 Claims

ABSTRACT OF THE DISCLOSURE

A magnetic memory matrix system having row and column magnetic current steering switches driven by the same active component for reading the cores in the matrix in the coincident current mode and simultaneously providing a first half write current pulse to a previously read core. A sense amplifier responsive to the read output for selectively providing a second half write current pulse when the magnetic remanence state of a selected core is switched and a decoder system responsive to the position of the selected core to steer the second half write current pulse to the previously read core simultaneously with the first half write pulse.

ORIGIN OF THE INVENTION

The invention described herein may be manufactured and used by or for the Government of the United States of America for governmental purposes without the payment of any royalties thereon or therefor.

BACKGROUND OF THE INVENTION

This invention relates to magnetic memory matrix systems and more particularly to an improved circuit arrangement for the non-destructive reading of the information contained in the matrix.

Computers and data processing systems predicated on data storage and retrieval principles have been used for some time to solve complex problems, verify the function of certain systems, and to check out various operating procedures in a relatively short period of time. As would be expected, the speed, accuracy and reliability of such systems have made their use in technology associated with complex aerospace vehicles highly desirable if not mandatory. This is particularly true during the preparation, launch and actual flight phases of a vehicle wherein the operation of numerous circuits and systems, as well as the accuracy of certain maneuvers, must be verified in rapid succession to determine if a "go" or "no-go" situation exists.

The recent advent of manned space flight has placed an even greater demand upon the use of computers and data processing systems since they must now be incorporated in large numbers into the space vehicle itself to supplement or verify the functions performed by the astronauts. However, many of the data storage retrieval principles and systems that are suitable for use in normal business activities or flight check-out procedures at earth based sites are not adequate for incorporation into space vehicles. Besides the obvious problems concerning size, weight and power requirements associated with conventional systems, there are several other trouble areas that prohibit their use aboard space vehicles. For example, any computer system of the type which employs an electric motor to drive a tape or cam can be used only restrictively on board a space vehicle as a flight programmer since the vacuum of space causes bearings to freeze, and the heat generated by the motor cannot be readily dissipated. Programmer systems using resistor-capacitor type timing devices, even with heavy temperature compensation, have also proved unreliable when required to operate over the wide temperature ranges encountered in space. The use of programmer systems employing a diode matrix sacrifices flexibility of programming and, to a certain extent, reliability.

The failure of the above listed types of flight programmers to qualify for use aboard orbiting space vehicles resulted in an investigation being made into the possibilities of using a magnetic core matrix memory system. As is well known, the magnetic core matrix memories are extensively employed as storage devices in electronic computing machines. It is common in the operation of a computer using magnetic core memories to store a quantity of data in binary form in the memory by placing some of the cores in one magnetic orientation and other cores in another distinct magnetic orientation. The combinations of cores at various magnetic orientations are recognizable by the computer and representative of data.

In a typical machine using binary storage elements the cores in a matrix are composed of an alloy having a substantially rectangular hysteresis loop, each core being capable of retaining either of two opposite magnetic remanence states indefinitely unless switched to the other state by a current passing along the wires running through the matrix. The opposite remanence states conventionally employed for representing binary information are arbitrarily designated as "0" and "1." With a 0 stored, a pulse applied to a winding linking the core in proper sense causes the loop to be traversed, switching the core to the 1 state. The remanence state 1 is retained after the pulse terminates. Such a pulse is a "write" pulse. Similarly, the core is "read out" or returned to the 0 state in determining what information has been stored by applying a pulse in reverse sense to the same or another winding. Such a pulse is a "read" pulse. Should a 1 have been stored, a large flux change occurs with the shift from the 1 to 0 conditions with a corresponding voltage magnitude developed on an output winding. On the other hand, should a 0 have been stored, little flux change occurs and negligible signal is developed on the output winding.

All the cores may initially be set to the magnetic state representing the binary 0 for purposes of encoding the matrix. Selective passage of current through the core driver wires then switches the desired pattern of cores to the 1 state. This switching may be accomplished by coincidence of current along two wires intersecting at the selected core, each wire carrying a half-select current, or half of the current necessary to produce the magnetic force to switch the core. Once the core matrix memory is loaded with data, the data remains until destroyed or replaced.

However, for use aboard the launch or orbiting space vehicle, the flight programmer must not only be capable of supplying a series of pulses at predetermined time intervals to actuate various control devices in the vehicle, but must also be capable of repeated reading during the check-out phases of the mission. Since the precise program to be used in controlling the space vehicle may not be determined until the last moments before the beginning of a flight, or until the last few moments before re-entry of the space vehicle into the earth's atmosphere, it must also be possible to insert data into the programmer through an umbilical cord or a telemetering link. Further, the physical characteristics of the programmer must be such that it is capable of withstanding extreme shock that may be encountered during acceleration phases of the flight and of continuous operation in a vacuum where wide temperature variations and other adverse operating conditions exist. Ideally, it should weigh less than 1 kg. (two pounds), occupy less than .03 m.$^3$ ($1^3$ foot) of space and draw less than one watt of power.

In all conventional or prior known non-destructive core memory units, the transfer of information is either made to a buffer register and back each time it is read, or a multi-aperture magnetic core non-destructive memory matrix has been used. The use of a buffer register was found to be unacceptable aboard a space vehicle however, because of its undesirable complexity, size, weight and high power consumption; while the use of a multi-aperture core matrix was rejected for the following reasons: (1) Too much power is required for unblocking the matrix; (2) the read currents must have maximum and minimum values rather than single-ended inequalities, as would be the case if single aperture cores could be used; (3) design considerations for "worst case" operation in the temperature extremes to be encountered in outer space are difficult to accurately ascertain; (4) the multi-aperture cores must be wound in a matrix consisting of a double mat of wires with each of the mats requiring a separate drive which in turn, results in an increase in the wiring complexity of the matrix and an increase in the number of drivers required for proper operation; (5) these cores operate as a result of flux transfer with the consequential slow domain-wall movement. Therefore, the minimum readout time is about twice the characteristic switching time of core materials plus propagation time for setting up the reading of the matrix.

SUMMARY OF THE INVENTION

According to the present invention it has been found that a programmer can be made which has none of the aforementioned shortcomings by employing a non-destructive magnetic core memory matrix constructed around the use of single aperture magnetic core pieces. The use of single aperture magnetic core pieces for fabricating the matrix is made possible by the novel technique of simultaneously transferring the information being read out of a given core back to a core that has previously been read and transferred. This technique, coupled with the unique use of a read sensing operating unit, permits the non-destructive single aperture core matrix to be read an indefinite number of times at speeds heretofore unattainable with very little power being required for proper driving.

Accordingly, one object of this invention is to provide a programmer for supplying a series of actuating pulses at predetermined time intervals.

Another object of this invention is to provide a programmer which uses a non-destructive matrix employing single aperture magnetic storage cores and is particularly adapted for use on aerospace vehicles.

DESCRIPTION OF THE DRAWINGS

These and other objects and advantages of this invention will be more apparent upon reference to the following specification, appended claims and drawings wherein:

FIGURE 1 is a block diagram of the programmer system constructed in accordance with this invention wherein the blocks of the diagram represent the various elements of the system and the solid lines illustrate the manner in which the elements are electrically interconnected with one another to produce a train of control signals;

FIGURE 2 is a schematic diagram of the blocking oscillator employed for actuating the two-phase driver of the programmer system;

FIGURE 3 is a circuit diagram of the two-phase driver utilized for driving the four-way current steering switch of the programmer system;

DESCRIPTION OF A PREFERRED EMBODIMENT

Figure 4:
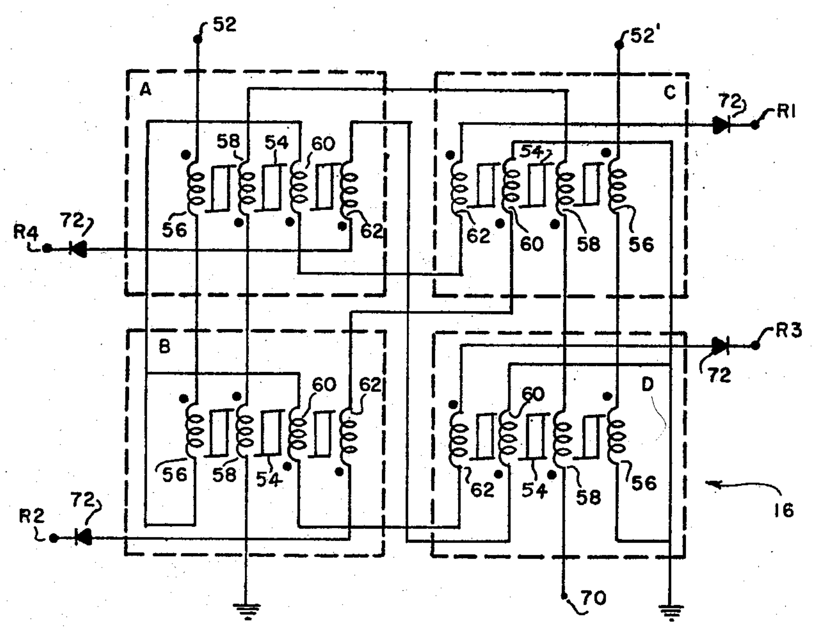
FIGURE 4 is a circuit diagram of the four-way current steering switch used to convert the two-phase input from the driver unit of the system to a series of pulses delivered in sequence through four separate output terminals.

With continued reference to the accompanying figures wherein like numerals designate similar parts throughout the various views, and with initial attention directed to FIGURE 1, reference numeral 10 designates a programmer system illustrated in block form. As can be seen, this system is built around a magnetic memory matrix 18, which for purposes of illustration, is shown as a "four-by-three unit." The readout of the matrix is taken in the coincident current mode and the selection of the stored bit or signal to be read from the memory matrix at any given time is controlled by four and six-way current steering switches 16 and 22, respectively, which provides a half read pulse to successive row read lines 82, 84, 86, and 88 and to successive column read lines 96, 98, and 100. These switches are both driven by a two-phase current provided by the two-phase driver 14, on lines 31 and 33 in a manner that will be more fully explained hereinafter. A blocking oscillator 12 drives the two-phase driver 14 and acts as a buffer between the phase driver and the external clock source 27.

In a manner to be more fully explained hereinafter the matrix 18 has twelve cores with a maximum storage capacity of eleven words, one bit per word, with one core sacrificed for information content so that the information on any particular core may be transferred one core space back every time the information on a core is read. In general the information is transferred as it is read by prewiring the matrix 18 with internal feedback lines to automatically apply a first half write pulse to a previously read and therefore cleared core. A sense amplifier 24 is coupled to the matrix by sense winding 146 for sensing the data stored in the core being read and for generating a second half write pulse when the remanence state of a selected core is switched. The second half write pulse appears on lead 143 and with the cooperation of the decoder 20 is applied to the previously read core through one of the row write lines 138, 140, 142, and 144.

The blocking oscillator 12 on the front end of the programmer system 10 serves as a buffer between the clock source 27 and the two-phase driver 14 which is electrically connected to the oscillator through an electrical lead 28. As seen in FIGURE 2, the blocking oscillator 12 employs a linear transformer 30 which is connected in a conventional feedback configuration between the input and output of an active element, here shown as the collector and base of a transistor 32. This circuit arrangement permits the omission of any reset winding or bias requirements. Thus, pulses (as shown at the input lead 26 of FIGURE 1) in the hundred nanosecond region will easily trigger the relatively high-powered two-phase driver 14 through the action of the blocking oscillator 12. Also, the noise on the input line 26 is effectively blocked by the oscillator and cannot, therefore, decrease the flux content of the square loop cores used in the two-phase driver 14 as would otherwise be the case if the phase driver were being driven directly.

FIGURE 3 illustrates the preferred construction of the two-phase driver 14 which consists of two substantially identical blocking oscillators 34 and 34' that are electrically connected so that the setting of one resets the other. The function of the driver is to convert the incoming single-phase clock pulses from the oscillator 12 into a two-phase output for not only furnishing all the power necessary for the operation of the four-way and six-way current steering switches 16 and 22, but also the read lines of the matrix, the decoder 20, and half of the write lines of the matrix in a manner that will be more fully explained hereinafter. Thus, with the two-phase driver operating in this manner, the only other current source necessary for the operation of the system is that furnished by the sense amplifier 24 which produces half of the current used for writing into the matrix 12.

The blocking oscillators 34 and 34' each utilize square loop cores 36 and 36' which have trigger, clear, set, bias and reset windings, as indicated by numerals 38, 40, 42, 44, and 46 and 38', 40', 42', 44', and 46' respectively, mounted thereon and polarized in the direction indicated by the "dots" associated therewith. Trigger windings 38 and 38' of the two blocking oscillators are connected in series between input lead 28 and a common source B+. Clear windings 40 and 40' are also connected in series between the clear input terminal 50 and the common ground terminal 48. The output 52, set winding 42 of oscillator 34, and the reset winding 46' of oscillator 34' are connected in series to the emitter of transistor 54' which forms the active element in the oscillator 34'. The second output 52' is connected in a similar manner through set winding 42' and reset winding 46 to the emitter of the transistor 54 of oscillator 34.

The principle of operation of the two-phase driver 14 is as follows: after the square loop core 36 has been "reset" and the core 36' "set," which is accomplished by energizing the clear windings 40–40' with a pulse applied to the terminal 50, the first incoming pulse applied to the terminal 28 from the oscillator 12 will induce a voltage through the trigger winding 38' into the bias winding 44' of the "set" core 36'. However, no voltage will be induced in the core 36 by trigger winding 38 since the core is in a "reset" condition. Since the bias winding 44' is connected between the emitter and base of transistor 54', the blocking oscillator 34' will be biased into a conducting condition. The conduction of the transistor 54' produces a current flowing through the reset winding 46' of oscillator 34', set winding 42 of oscillator 34, and the first output terminal 52. This current flow through the reset winding 46' initiates the switching of the square core 36' and simultaneously "sets" the core 36 through winding 42. As the core 36' switches it maintains bias by transformer action through bias winding 44', thus allowing the transistor 54 to conduct until core 36 is completely switched. For this reason the duration of the output pulse on the output terminal 52 is dependent solely on the switching time of the core 36'.

With the square core 36 now in a "set" condition and core 36' in a "reset" condition, the second incoming pulse from the blocking oscillator 12 induces a voltage through the trigger winding 38 into bias winding 44 of transistor 54 thereby causing it to conduct. This conduction through the reset winding 46, set winding 42', and the second output terminal 52' initiates the switching of core 36 and "sets" core 36' for the nxet cycle of operation. As the core switches it also maintains bias on the base of the transistor 54 thus allowing the transistor to conduct until core 36 is completely switched. From this operating procedure it can be seen that for every two input pulses applied to the terminal 28, one pulse will appear on each of output terminals 52 and 52'.

As the name implies, the current steering switches 22 and 16 are utilized for converting a two-phase input to a series of pulses delivered in sequence through a number of outputs so as to access the memory matrix in the coincident current mode. Although the type of current steering switch to be described hereinafter may be designed with any number of outputs, for purposes of clarity and simplicity only the four-way current steering switch 16 will be described in detail. It is to be understood, however, that the six-way current steering switch 22 functions and is constructed in substantially the same manner as is the switch 22.

As seen in FIGURE 4, the current steering switch 16 consists of four interconnected "blocks" designated as A through D. Each block includes a core 54 that has a substantially rectangular hysteresis loop characteristic. A driver, clear, steer and reset winding, designated as 56, 58, 60, and 62 respectively, are wound about the various cores with each winding polarized in the direction indicated by the associated dots. The output terminals 52 and 52' of the two-phase driver 14 are provided for energizing the blocks A through D while output terminals R1, R2, R3, and R4 respectively, for receiving the signals therefrom are respectively connected to each block. A single input terminal 70 is provided for energizing the various clear windings 58. Since the setting and resetting of the cores would introduce bi-directional signals into the memory matrix 18, diodes 72 are used in the outputs to assure current flow in only one direction into the memory.

The operation of the current steering switch 22 can be explained in substantially the following manner. Initially, the clear windings 58 are energized by applying a current pulse to the terminal 70 thereby causing the core 54 of block A to be placed in a "set" condition while the other cores of blocks B through D are "reset." As the first current pulse from the two-phase driver is applied to terminal 52, the drive winding 56 around the core of block A will be energized thereby resetting the core and inducing a voltage in the steer winding 60. Since the core of block B is already in a reset condition, no voltage will be induced in this core although the current pulse also flows through its drive winding. Thus, even though two parallel current paths are presented to the input current pulse; namely, the one through the steer winding 60 of block A and the other through the steer winding 60 of block B; the polarity of the induced voltage on the steer winding of block A will result in all of the current being steered through this core into the reset winding 62 of block C and the output terminal R1 of block C.

As will be apparent, the current pulse that flows through the reset winding of block C into the output terminal R1 will result in the core of block C being switched to a set position. Thus, upon the arrival of the second pulse from the two-phase driver 14, which will appear on the terminal 52', the core of block C will be reset thereby inducing a steering voltage in the steer winding 60. This voltage will cause the pulse of current to flow through the steer winding 60 of block C and the reset winding 62 of block B to the output terminal R2 thereby setting the core of block B and preparing it for the next pulse to appear on input 52.

The second current pulse on input 52 is steered by the steer winding on the core of block B into the reset winding on the core of block D thereby resetting the core and producing a pulse on output terminal R3. Upon the arrival of the next current pulse on input terminal 52', the core of block D will reset while the core of block A is set and a readout pulse is produced on output terminal R4.

Thus, it is seen that the four-way current steering switch is made entirely of passive circuit elements and produces four output channels from the two-phase input. The six-way current steering switch 22 is also driven by the two-phase driver in a manner hereinafter explained and is constructed in a similar manner to the four-way current steering switch except that six output channels are provided.

Figure 5:
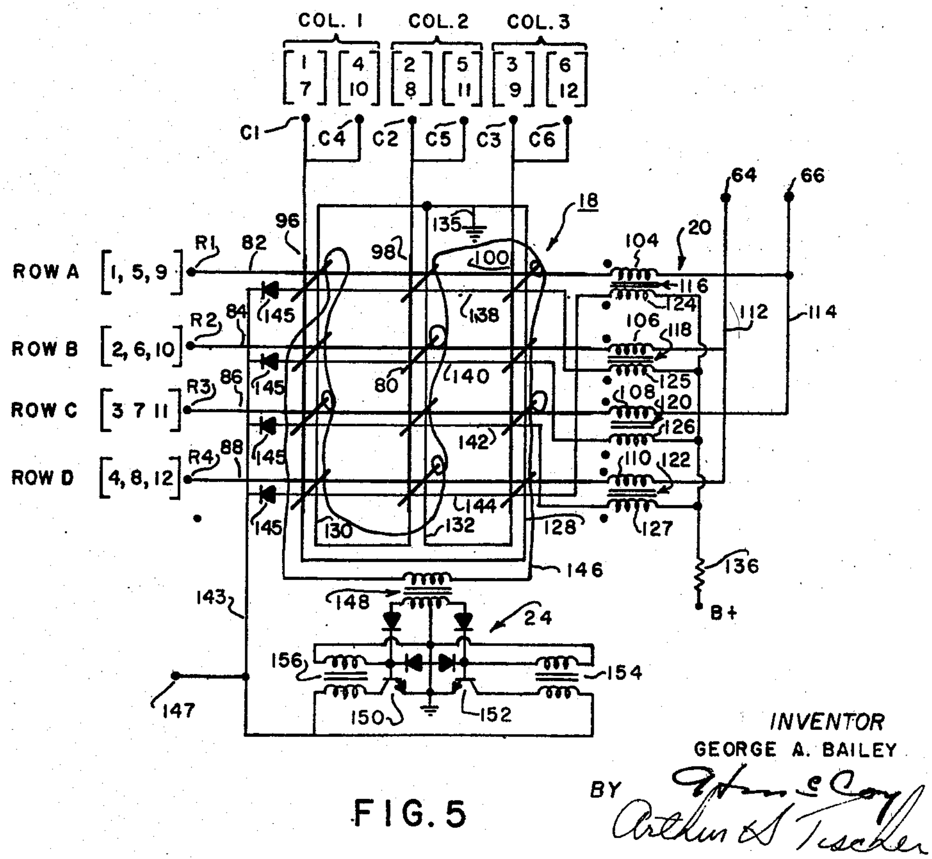
FIGURE 5 is a schematic representation, of the magnetic non-destructive memory matrix, decoder and sensing amplifier.

Referring now to FIGURE 5, there is shown the circuit diagram of the memory matrix 18, decoder 20 and sense amplifier 24 according to one embodiment of the present invention. The memory matrix is schematically illustrated in FIGURE 5 where the several single aperture cores comprising the matrix are indicated as short diagonal lines making acute angles to the right and are typically identified by reference numeral 80. The several magnetic members are of the type having relatively square hysteresis loops characteristics and therefore have two stable states of operation arbitrarily designated as "0" and "1," as is well known in the art, and by definition currents coming from the left through the core will read, or reset, the core to the 0 state and currents entering the core aperture from the right will write, or set, the core to the 1 state. These cores are arranged in columns and rows or more specifically in four rows and three columns with the rows designated alphabetically as row A, B, C, D, and the columns designated as 1, 2, 3, so that each core may be designated by its coordinate; such as core 1A is positioned at the intersection of column 1 and row A.

In the schematic representation of the memory matrix 18 of FIGURE 5, each line passing through a core, as represented by a diagonal line, represents a coil of one turn wound around the particular core. The memory matrix includes a series of row input terminals R1 to R4, inclusive. These terminals are connected to corresponding switching terminals of the four-way current steering switch 16. The memory core of FIGURE 5 also includes a series of column input terminals C1 to C6, inclusive. These column input terminals are connected to corresponding switching terminals of the six-way current steering switch 22.

The input terminals R1 to R4 are respectively connected to a plurality of lines 82, 84, 86, and 88. These lines each link a coil on each of the cores of an associated row of cores of the memory matrix. The ends of the lines remote from the input terminals are respectively connected to the drive windings 104 to 110, inclusive, of linear core transformers 116, 118, 120, and 122, inclusive. The opposite end of windings 104, 106, 108, and 110 are alternately connected to terminals 64 and 66 through lines 112 and 114 to effectively regroup the output of the four-way steering switch into a two-phase input necessary to drive the six-way current steering switch 22. Terminals 64 and 66 provide the input to the six-way current steering switch of FIGURE 1.

The matrix 18 is also provided with lines 96, 98, and 100, which each link a coil of one turn on each of the cores of an associated column of cores. As seen in FIGURE 5, line 96 is connected to terminals C1 and C4, line 98 is connected to terminals C2 and C5 and line 100 is connected to terminals C3 and C6. The ends of lines 96, 98, and 100 opposite from terminals C1 to C6 are fed back one column in the matrix and are respectively connected to lines 128, 130, and 132, which lines each link a coil of one turn on each of the cores of an associated column of cores. The remote ends of lines 128, 130, and 132 are connected to ground 135.

As an aid to understanding the read scan pattern obtained in this embodiment, the sequential order of the pulses appearing on the outputs of the four-way and the six-way current steering switches are shown in brackets in FIGURE 5. The arrangement is such that when the first half read pulse appears on line 82 the first half read pulse from the six-way current steering switch will appear on line 96 and the excited core will be at the intersection of column 1 and row A. In a like manner on the second clock pulse, a pulse will appear on line 84 and on line 98 and the core at the intersection of column 2 and row A will be read. Thus, while the four-way current steering switch is producing half read pulses on successive row lines, the six-way current steering switch is producing half read pulses on successive column lines with these latter pulses combining with the former to provide a read current to the cores at the intersection of the lines.

The sense amplifier generally shown at 24 serves as the means to detect the presence or absence of the remanence state "1" as the memory matrix is read and to produce a half write pulse on the occurrence of a "1" being read. The sense amplifier employs a sense winding 146 which is wound on the respective cores in such a manner as to reverse the sense of the winding on every core in progressing through the matrix thereby tending to cancel voltages produced by partial drives in the well-known manner. Sense winding 146 is connected to the primary winding of the transformer 148 and a center tapped secondary winding has its opposing ends connected to the base elements of transistors 150 and 152. As seen in FIGURE 5, the sense amplifier 24 employs linear transformers 154 and 156 which are connected in a conventional feedback configuration between the input and output of an active element, here shown as the collector and base of transistors 152 and 150. Thus, pulses on the sense winding 146 caused by the switching of the magnetic cores from the "1" state to the "0" state trigger either 150 or 152 into conduction so as to draw current through the decoder 20 and the row lines 138 to 144.

The decoder 20 of FIGURE 5 provides not only the means for regrouping the pulses on row windings 82, 84, 86 and 88 so as to provide a two-phase input to the six-way current steering switch, but also serves to selectively steer the half write pulse produced by the sense amplifier 24 to row lines 138, 140, 142, and 144. As seen in FIGURE 5, the decoder 20 employs transformers 116, 118, 120, and 122 each utilizing linear cores which have drive windings 104, 106, 108, and 110, and steer windings 124, 125, 126 and 127 formed thereon and polarized in the direction indicated by the "dots" associated therewith. As seen in FIGURE 5, one side of the steer windings 124, 125, 126, and 127 is connected to a current source B+ through limiting resistor 136 while the opposing ends of the steer windings are transferred one row back from their associated drive windings to row lines 138, 140, 142 and 144. The opposing ends of row lines 138, 140, 142, and 144 are connected to the output terminal 147 through lead 143 and diodes 145 which are provided to insure current flow in only one direction in lines 138, 140, 142, and 144.

For purposes of explaining the operation of the memory matrix 18, decoder 20 and sense amplifier it will be assumed that a "1" is stored in core 1A, that core 3D is initially sacrificed for information content and is in the remanence state "0" and that the first half read pulse of current from the four-way current steering switch has just been produced on terminal R1 to energize line 82. This current pulse passes through the drive winding 104 of the decoder to line 114 and terminal 66 to energize the six-way current steering switch. This same pulse of current passes through the six-way current steering switch and appears as a half read pulse on terminal C1 and line 96 and as a half write pulse on line 128, since line 128 links the cores in the opposite sense as line 96.

Core 1A which is at the intersection of lines 82 and 96 will, therefore, have applied to it a read current pulse which will induce sufficient magnetic force to switch the core from the "1" state to "0" state. This change in flux in the core will induce a voltage in sense winding 146 which will trigger either transistor 152 or 150 into conduction and cause diodes 145 to be biased for conduction. The diode that will conduct is determined by the decoder 20 in the following manner. As the half read pulse appears on line 82, drive winding 104 of the decoder will be energized and will induce a voltage in steer winding 124. Thus, even though four parallel current paths are presented to carry current produced by the sense amplifier, namely, through either steer windings 124, 125, 126, 127, the polarity of the induced voltage on steer winding 124 will result in all of the current being steered through this winding to line 144 and a half write pulse will be applied to the cores in row D and output terminal 147.

This half write pulse together with the half wire pulse appearing on line 128 will cause the core 3D which is at the intersection of lines 144 and 128 to have a write pulse applied which will induce sufficient magnetism to switch the core from the "0" state to the "1" state so as to effectively transfer the information contained in core 1A to core 3D. If a "0" was originally contained in core 1A, the core would not switch when half read pulses were applied to lines 82 and 96 and the sense amplifier would not be energized. Therefore no half write pulse would be applied to line 144 so that the information contained in core 1A is transferred to core 3D by allowing core 3D to remain in the "0" state.

It is noted that core 1A will be in the "0" state after being read regardless of its state before the reading operation and thus is automatically set to receive information from the next selected core. Thus on the occurrence of the second clock pulse, core 2B, which is at the intersection of line 84 and line 98 will be read and the information contained therein will be transferred to core 1A by automatically feeding back a first half write pulse to line 130 and selectively applying a second half write pulse to line 138 in the same manner as previously described.

Thus, the present invention provides unique circuitry for reading a magnetic memory matrix in the coincident current mode and transferring the information in the core being read at any particular time into a previously read and, therefore, cleared core so that the information in any particular core slips back one core space every clock pulse. It is noted that since the reading and writing functions are generated during the same clock pulse the system is twice as fast as the conventional two-beat system which requires load and unload operations. While a four-by-three memory matrix has been described it will be appreciated by those skilled in the art that other configurations could be used with a corresponding change in output channels of the row and column current steering switches. Additionally, it will be readily apparent that more than one memory matrix plane could be used so long as corresponding logic and drive current were included for each plane.

Still further variations will be suggested to those skilled in the art, and certain of these variations have already been discussed; it must therefore be emphasized that the foregoing description is meant to be illustrative only and should not be considered limitative of the present invention.

What is claimed is:

1. A magnetic matrix memory system, comprising:

(a) a plurality of bistable magnetic cores arranged in a matrix comprised of a plurality of rows and columns wherein the state of a core is indicative of a binary bit "1" or "0" and wherein said cores are settable to the "1" state and resettable to the "0" state by the application thereto of write and read electrical signals respectively;

(b) a plurality of read lines, one for each row and one for each column threading all the cores in the respective row or column, each of said read lines having an input and an output;

(c) reading means coupled to said inputs of the row and column read lines and responsive to a series of input pulses for applying coincident half read pulses to successive row and column read lines for the production of a combining flux strength in successive selected cores so as to reset those cores in the "1" state to the "0" state and to leave those cores in the "0" state unaffected;

(d) a sensing winding threading all the cores on which a readout signal is produced when the selected core is reset from the "1" state to the "0" state;

(e) a plurality of write lines, one for each row and one for each column threading all the cores in the respective row or column, each of said write lines having an input and an output each of said column write lines threading said cores in the opposite sense from said column read lines;

(f) first half write means for applying a first half write pulse coincidently with the half read pulses applied to said successive selected cores to the input of a column write line at least one column back from said selected core, said first half write means comprising current conducting connections coupling the respective outputs of said column read lines at least one column back to the respective inputs of said column write lines;

(g) second half write means having an input coupled to said sensing winding and having an output connected in circuit with said row write lines for producing a second half write pulse coincidently with said first half write pulse each time a readout signal is produced; and (h) decoder means connected in circuit with the row write lines and responsive to the row position of the selected core for steering said second half write pulse to a row write line at least one row back from the selected core.

2. A magnetic matrix memory system as defined in claim 1 wherein said second half write means includes a sense amplifier having an input coupled to said sensing winding and having an output connected in circuit with said row write lines.

3. A magnetic matrix memory system as defined in claim 1 wherein said reading means includes:

(a) first switching means having an input and having a plurality of output terminals coupled respectively to said inputs of said row read lines for applying half read pulses to successive row read lines;

(b) second switching means having an input coupled to the output of said first switching means and having a plurality of output terminals coupled respectively to said inputs of said column read lines for applying half read pulses to successive column read lines;

(c) drive circuit means coupled to said input of said first switching means for causing said first and second switching means to introduce a half read pulse to successive inputs of said row read lines and to introduce a half read pulse to successive inputs of said column read lines.

4. A magnetic matrix memory system as defined in claim 1 wherein:

(a) said decoder means includes a plurality of transformers, one for each row of said matrix, each having a drive winding having a first and second end and a steering winding having a first and second end;

(b) means connecting respective first ends of said drive winding to the respective outputs of said row read lines, whereby said half read pulses appearing on successive row read lines will induce a steering voltage in successive steering windings;

(c) current conducting connections coupling the respective first end of the steering windings at least one row back to the respective inputs of said row write lines;

(d) current conducting connections coupling respective second ends of said steering windings to a current source; and (e) unilateral conducting means coupling respective outputs of said row write lines to said output of said second half write means for insuring current flow only in the write direction in said row write lines.

5. A magnetic matrix memory system as defined in claim 4 wherein said reading means includes:

(a) a drive circuit for obtaining a series of half read pulses;

(b) a first magnetic current steering switch having an input coupled to said drive circuit and formed from a plurality of magnetic elements connected in a particular relationship for steering said half read pulse to successive row read lines in accordance with the sequential magnetic activation of the different magnetic elements in the first magnetic current steering switch; and (c) a second magnetic current steering switch having an input coupled to said second ends of said drive windings and formed from a plurality of magnetic elements connected in a particular relationship for steering said half read pulses to successive column read lines in accordance with the sequential magnetic activation of the different magnetic elements in the second magnetic current steering switch.

6. A magnetic matrix memory system as defined in claim 5 wherein said sensing winding is coupled to said cores to provide substantial cancellation of voltages induced from half-selected cores.

7. A magnetic matrix memory system as defined in claim 5 including unilateral conducting means coupling said first and second magnetic current switches respectively to said row read lines and to said column read lines for insuring current flow only in the read direction in said row and column read lines.

8. A magnetic matrix memory system as defined in claim 4 wherein said second half write means includes a sense amplifier having an input coupled to said sensing winding and having an output connected to the inputs of said row write lines.

References Cited

UNITED STATES PATENTS

| | | | |
|---|---|---|---|
| 3,016,521 | 1/1962 | McGuigan | 340—174 |
| 3,146,426 | 8/1964 | Agon et al. | 340—174 |
| 3,296,604 | 1/1967 | Perschy | 340—174 |

BERNARD KONICK, Primary Examiner

KENNETH E. KROSIN, Assistant Examiner